Figure 3:
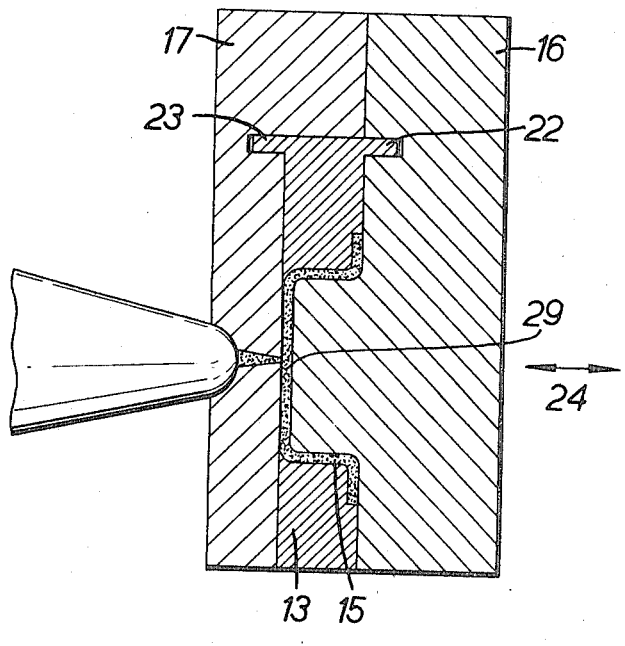

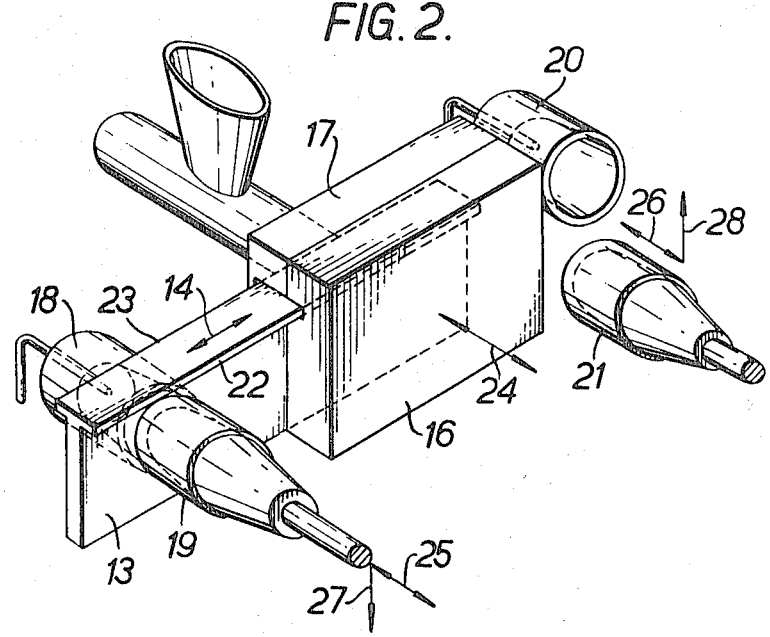
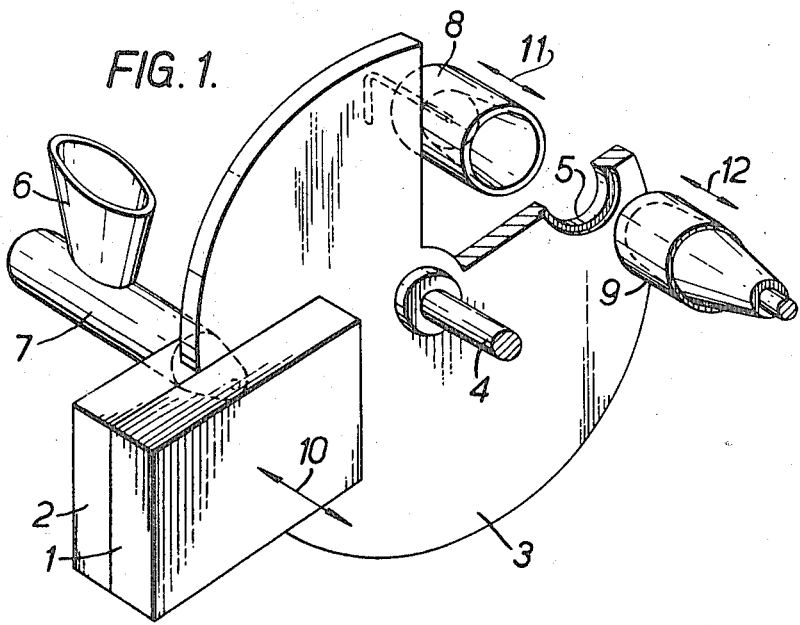

INVENTORS.
ARIE HEY &
WILLEM FREDERIK HOPPEN
BY
their ATTORNEYS.

United States Patent Office 3,324,509
Patented June 13, 1967

3,324,509
DEVICE FOR MANUFACTURING A HOLLOW OBJECT FROM THERMOPLASTIC MATERIAL
Arie Hey, Hendrik-Ido-Ambacht, and Willem Frederik Hoppen, Schiedam, Netherlands, assignors to Lever Brothers Company, New York, N.Y., a corporation of Maine
Filed Apr. 27, 1964, Ser. No. 362,833
6 Claims. (Cl. 18—5)

This invention relates to a device for the manufacture of a hollow object from thermoplastics, provided with an injection mould consisting of several parts, one interposed movable part being so arranged that when during an injection molding operation its position corresponds with that of the mould it will pick up a preliminary moulding made thereby, subsequently transporting it to a finishing station provided with finishing elements for imparting the ultimate shape to the object. With such a device hollow objects can be made having a much smaller wall thickness than could be achieved by injection molding alone. The term "external application of force" covers all operations that result in deformation of the preliminary moulding, such as blowing, vacuum moulding, extruding or a combination of these, such as vacuum moulding with the aid of a plunger.

With the known devices of this kind the preliminary moulding is always injected onto a core with the aid of which the preliminary moulding is transported to a blowing mould in which it is blown up to its ultimate shape by means of compressed air introduced via the core. As the temperature of the core is not distributed evenly, being higher near the place of injection, when the preliminary moulding is injection molded, than the temperature of the remaining part of the core, difficulties will arise, especially if the plastic to be operated upon of low heat retention, or if the preliminary moulding itself is relatively thin-walled. During the deformation of the preliminary moulding in a subsequent process by means of external force the preliminary moulding will readily fracture owing to the uneven plasticity curve of the material of the preliminary moulding caused by uneven cooling. It has therefore already been suggested that by means of special devices the entire core should be kept at an even temperature which is most suitable for blowing. In Belgian patent specification 571,693, for example, it is known that with a device as described a core can be used as a movable injection molding part, such core being provided with a large number of channels for carrying a heating liquid.

With a device in accordance with the invention the above-mentioned drawbacks are effectively and easily avoided in that the interposed, movable part of the injection mould is a centre plate movable within its plane and having virtually parallel sides, against each of which an outside mold part can be attached in order to enclose the cavity for the preliminary moulding, this cavity being partly formed by a collected cavity extending transversely through the movable centre plate. Since owing to this measure the preliminary moulding is in contact with a carrier only along its circumference, whilst the part of the preliminary moulding to be deformed by external force is only in contact with the surrounding air, this part will cool off gradually. Furthermore, it is a simple matter by heating the outermost parts of the mould to maintain the injected preliminary moulding at an even temperature as desired for the subsequent deformation. This is of importance if, for instance, the treatment cycle of deforming the preliminary moulding takes longer than the injection molding thereof, whereas these operations commence at the same moment.

For preference the elements for imparting the ultimate shape to the preliminary moulding comprise a part containing a moulding chamber and a pressure element, the latter element being arranged for clamping the moulding piece along its circumference against the part containing the moulding chamber or against the centre plate. In order to enable a particular injection molding press to operate more rapidly, the centre plate can be provided with a number of collecting cavities which are alternately inserted between the outermost parts of the mould in completion thereof. The centre plate can be provided with two collecting cavities and arranged for performing a reciprocating motion, a set of elements being provided on either side of the injection mold for imparting the ultimate shape to a preliminary moulding. At least one of the outermost moulds can be so arranged as to guide the centre plate during its movement.

Alternatively, the centre plate may be arranged as a rotary disc provided with a number of collecting cavities at the same radius from the centre, which disc can be driven intermittently.

The invention is explained in detail below by reference to the diagram in which, by way of example, two embodiments of the invention are depicted.

Shown in the mainly schematic diagram are:
FIGURE 1 a first embodiment in perspective;
FIGURE 2 a second embodiment in perspective;
FIGURE 3 of the two embodiments a cross-section of the injection mold, and
FIGURE 4 a cross-section of a finishing station.

Of a first embodiment FIGURE 1 shows an injection mould consisting of two casting mould blocks, 1 and 2 respectively, between which is a circular casting mould centre plate 3, partly broken away in the drawing, which is supported so as to pivot on shaft 4. In the centre plate 3 two diametrically opposed collecting cavities 5 are made, the one situated between blocks 1 and 2 not being visible in the drawing. An injection device of which the material feed funnel 6 and the spray-casting mould 7 shown by dotted lines where it is situated behind the mold operates in conjunction with the mold, 1, 3, 2.

Diametrically opposite the mold, 1, 3, 2 in relation to shaft 4 a finishing station is fitted in which the other collecting cavity 5 is located between two finishing elements 8 and 9, in which the finishing elements 8 and 9, likewise reciprocating in accordance with the double arrows 11 and 12 respectively, can be brought to bear against the centre plate 3 for the purpose of the finishing operation, and subsequently moved away from the centre plate 3 so as to free this plate, and in relation thereto to make room for the finished product to be ejected.

It is possible to combine with the centre plate 3 more than one injection station and more than one finishing station.

FIGURE 2 represents an embodiment which is identical in principle to the device in accordance with FIGURE 1, but in which the rotating centre plate 3 is replaced by a centre plate 13 which is capable of reciprocal movement in accordance with the double arrow 14. The centre plate 13 is provided with two collecting cavities 15 (see FIGURE 3), which are alternately placed between the same pair of casting mold blocks 16, 17, but each of which operates in conjunction with a different finishing station in which finishing elements 18, 19 and 20, 21 respectively are fitted.

The centre plate 13 is guided into the casting mold blocks 16 and 17 respectively, by flanges 22 and 13.

The casting mold block 16 is capable of reciprocal movement as per arrow 24 for the same purpose as described in connection with the casting mold block 2 in FIGURE 1. The finishing elements 19 and 21 are likewise capable of reciprocal movement as per double arrows 25 and 26, for the periodic clamping of the centre plate. As in this embodiment the centre plate 13 moves right out between the finishing elements 18, 19 and 20, 21 respectively each time, limited horizontal reciprocating motion combined with vertical motion of the finishing elements 19 and 21 will suffice for freeing the ejection chamber. From the position shown in the drawing, the next processing stage necessitates a downward movement of finishing element 19 in the direction of arrow 27 and an upward movement of finishing element 21 in the direction of arrow 28.

The sectional FIGURE 3 shows how a preliminary mold 29 is injected into the breaker-shaped space left free in the collecting chamber by the mold block 16. As shown in the drawing, the preliminary mold 29, fits exactly into the side surfaces of centre plate 13, so that the latter can eject the preliminary mold 29 between blocks 16 and 17, immediately the centre plate 13 ceases to be clamped between the blocks 16 and 17, thus ensuring that good heat contact is maintained with blocks 16 and 17, which may be heated. However, this is also possible by allowing the blocks 16 and 17 and the finishing elements 18–21 a slightly greater reciprocal movement, whereby the molding space in the preliminary mold can be extended beyond the dividing surfaces between the centre plate 13 and the molding blocks 16 and 17. What is permissible depends on various circumstances such as the kind of material used, the shape of the preliminary mold, etc.

Figure 4:
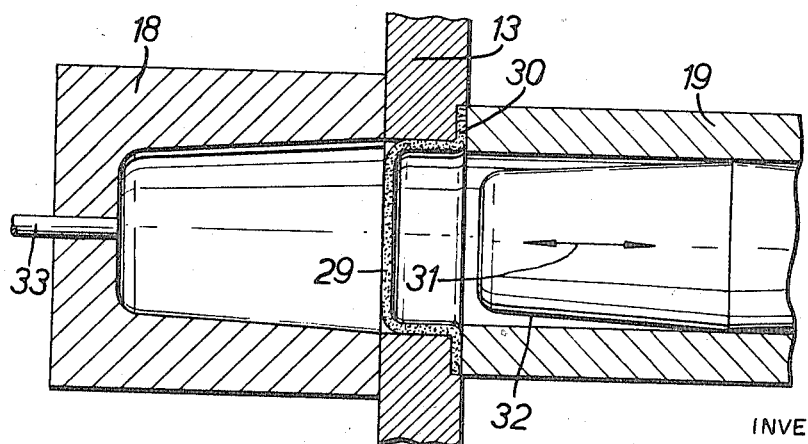

Finally, in FIGURE 4 is shown the set of finishing elements 18 and 19, which in FIGURE 2 is drawn bearing upon the centre plate. A preliminary mold 29 is clamped by its flange 30 between element 19 and centre plate 13. The pushrod 32 which is capable of reciprocal movement within element 19 in the direction of the double arrow 31 is about to enter the cavity of element 18, thereby stretching the preliminary mold 29 to its thin-walled ultimate shape. After the ejection chamber has been freed, the end product can be ejected, for instance by means of compressed air admitted via pipeline 33. Clearly, the finishing operation can be performed in other ways, as mentioned at the outset.

What we claim is:

1. A device for making hollow objects from thermoplastic material comprising a movable mold plate member having substantially parallel opposite surfaces, at least one mold cavity in and extending through said member and having open ends at said opposite surfaces, means supporting said mold plate member for movement in a direction parallel with said opposite surfaces between an injecting station and a finishing station, means at said injecting station engageable with one of said surfaces for injecting molten thermoplastic material into said mold cavity through one of said open ends, means at said injecting station engageable with the other of said opposite surfaces for closing the other end of said cavity to confine and shape said material into a partially finished article in said cavity, and means at said finishing station engageable with said opposite surfaces to shape said partially finished article in said cavity into a finished product.

2. The device set forth in claim 1 comprising means for heating said means for closing said other end of said cavity.

3. The device set forth in claim 1 in which said mold plate member has a plurality of cavities therein movable successively between said injecting station and said finishing station.

4. The device set forth in claim 3 in which said mold plate member is a disk mounted on said supporting means for rotary movement.

5. The device set forth in claim 3 in which said mold plate member is a substantially rectangular slide mounted on said supporting means for endwise sliding movement.

6. The device set forth in claim 1 in which said means at said finishing station for shaping said partially molded article into a finished product comprises a mold cavity-containing member engageable with one of said surfaces of said mold plate member, and means engageable with the other surface of said mold plate member for shaping said article into conformity with said mold cavity in said mold plate member and said mold cavity-containing member.

References Cited

UNITED STATES PATENTS

| 2,331,687 | 10/1943 | Hobson | 18—5 X |
| 3,184,524 | 5/1965 | Whiteford | 264—97 X |
| 3,218,379 | 11/1965 | Edwards | 264—322 X |
| 3,225,382 | 12/1965 | Hagen | 18—5 |

FOREIGN PATENTS 1,361,812  4/1964  France.

J. SPENCER OVERHOLSER, *Primary Examiner.*

W. L. McBAY, *Assistant Examiner.*